United States Patent [19]
Takahashi et al.

[11] Patent Number: 5,374,947
[45] Date of Patent: Dec. 20, 1994

[54] LASER BEAM PRINTER CAPABLE OF CHANGING SCANNING DENSITY AND PAPER TRANSPORT SPEED

[75] Inventors: Kazuhiko Takahashi; Yukinori Sezaki; Hideki Furuta, all of Saitama, Japan

[73] Assignee: Fuji Xerox Co., Ltd., Tokyo, Japan

[21] Appl. No.: 883,981

[22] Filed: May 18, 1992

[51] Int. Cl.$^5$ .............................................. B41J 2/435
[52] U.S. Cl. ..................................... 346/108; 358/298
[58] Field of Search ................. 346/1.1, 76 L, 107 R, 346/108, 160; 358/298, 296, 300, 302

[56] References Cited

U.S. PATENT DOCUMENTS

| | | | |
|---|---|---|---|
| 4,578,689 | 3/1986 | Spencer et al. | |
| 4,663,523 | 5/1987 | Swanberg | 250/235 |
| 5,045,869 | 9/1991 | Isaka et al. | 346/108 |
| 5,229,790 | 7/1993 | Matsuura et al. | 346/108 |

FOREIGN PATENT DOCUMENTS

| | | |
|---|---|---|
| 0183166 | 11/1985 | European Pat. Off. |
| 2137947 | 5/1990 | Japan |
| 2206566 | 8/1990 | Japan |
| 2238962 | 9/1990 | Japan |
| 1495299 | 12/1974 | United Kingdom |
| 2243262 | 10/1991 | United Kingdom |

OTHER PUBLICATIONS

Patent Abstract of Japan 2 206566, M-1043, Nov. 2, 1990, vol. 14, No. 501.
Patent Abstract of Japan 2 238962, M-1058, Dec. 14, 1990, vol. 14, No. 563.
Patent Abstract of Japan 2-137947, M-1010, Aug. 14, 1990, vol. 14, No. 375.
European Search Report dated Nov. 12, 1992.

*Primary Examiner*—Mark J. Reinhart
*Attorney, Agent, or Firm*—Finnegan, Henderson, Farabow, Garrett & Dunner

[57] ABSTRACT

A laser beam printer capable of changing the printing speed and quality. The laser beam printer includes a speed decoding unit for decoding a specification of the printing speed, and a speed setting unit for setting a transport speed for a sheet of paper taken as an object of recording in accordance with decoded contents of the printing speed.

5 Claims, 14 Drawing Sheets

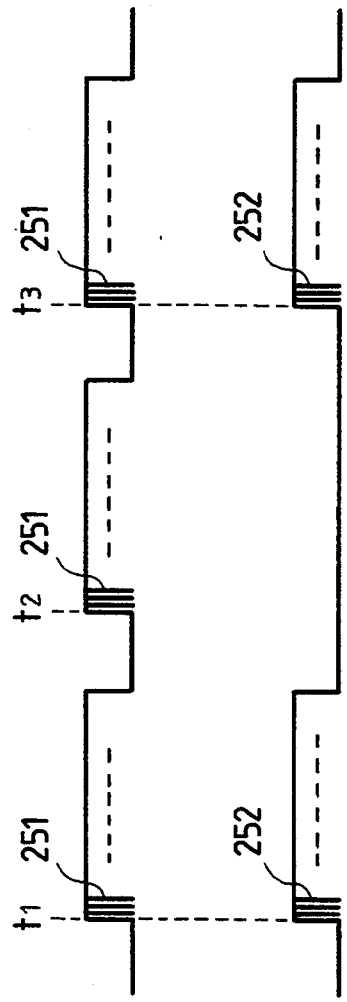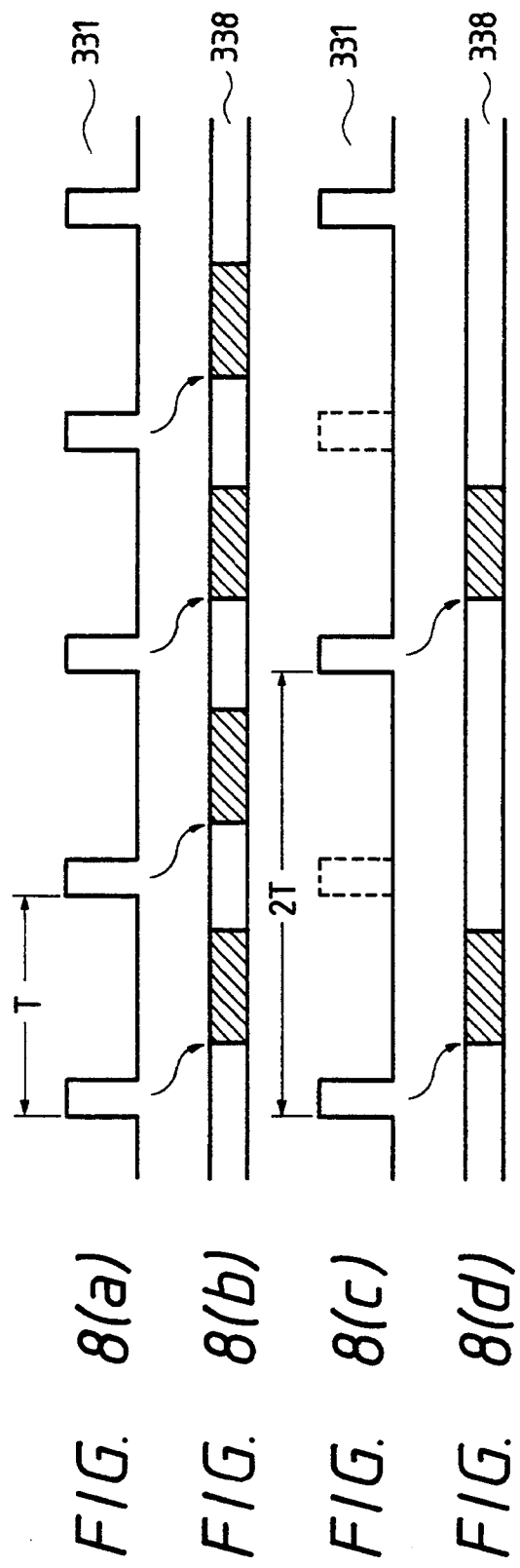

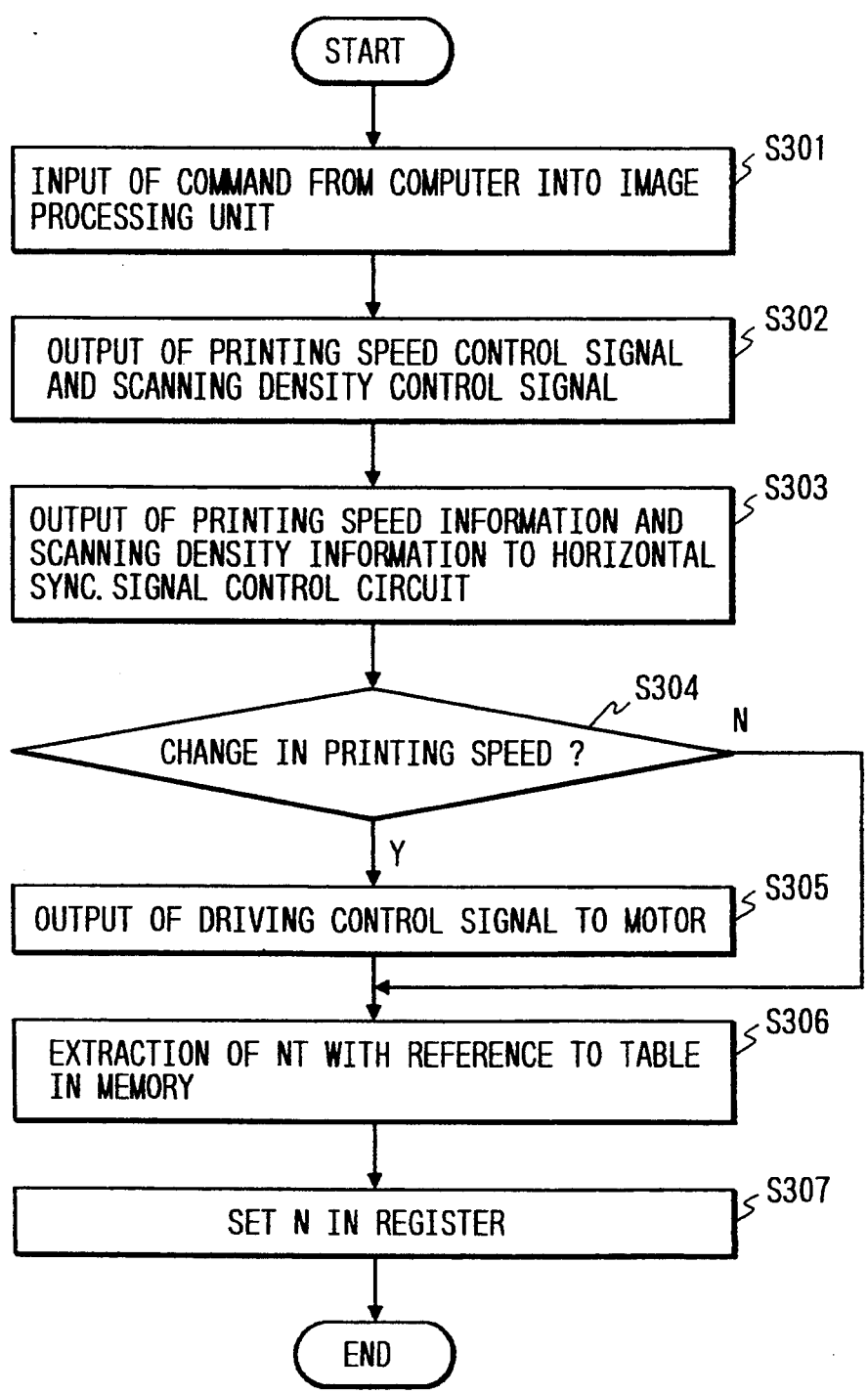

| SCANNING DENSITY D (DPI) | PRINTING SPEED S (PPM) | PERIOD OF HORIZONTAL SYNC. SIGNAL NT (SEC) |
|---|---|---|
| 600 | 10 | T |
| 600 | 5 | 2T |
| 400 | 5 | 3T |
| 300 | 10 | 2T |
| 300 | 5 | 4T |
| 200 | 10 | 3T |
| 200 | 5 | 6T |

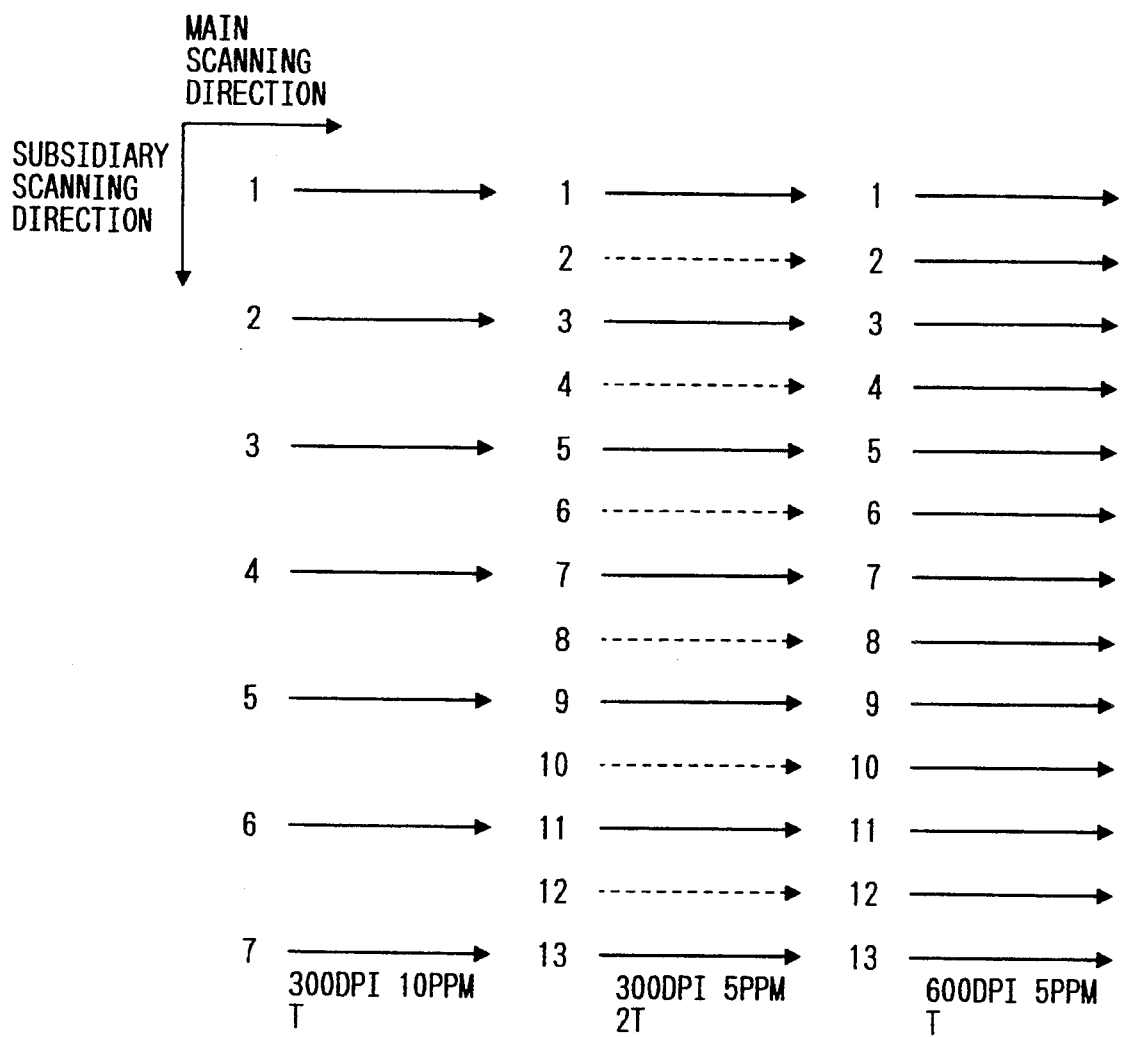

LASER BEAM PRINTER CAPABLE OF CHANGING SCANNING DENSITY AND PAPER TRANSPORT SPEED

BACKGROUND OF THE INVENTION

The present invention relates to a laser beam printer and more particularly to a laser beam printer capable of changing the printing speed and quality.

Various types of printers have been developed along with the propagation of work stations and word processors. Among such various types of printers, laser beam printers have been attracting much attention as printers capable of quietly printing at a high speed on ordinary paper.

FIG. 1 illustrates a schematic construction of a laser beam printer which has been used heretofore. A main unit 12 of this laser beam printer 11 is provided with a laser scanning unit 13 installed on its upper area, and this laser scanning unit 13 is constructed in such a way as to irradiate a laser beam as modulated in accordance with image signals onto a photoreceptor drum 15. Such component parts as a charge corotron 16, a developing unit 17, a transfer corotron 18, and a cleaning device 19 are arranged on the circumference of the photoreceptor drum 15.

In this construction, the charge corotron 16 performs the function to charge the photoreceptor drum 15 uniformly. The photoreceptor drum 15 thus charged loses its electric charge selectively in accordance with a scanning operation with a laser beam and forms a latent electrostatic image, Such a latent electrostatic image is developed by the developing unit 17, and a toner image is thereby produced on the surface of the drum. This toner image is transferred onto printing paper 23, which is fed out by semilunar rollers 22 from a cassette tray 21. The printing paper on which the toner image has thus been transferred is then fused by a fusing unit 24 and is thereafter discharged out of the printer. In FIG. 1, a broken line indicates a transport path 26 for the printing paper 23 which is fed out of the cassette tray 21.

Incidentally, a laser beam printer has a fixed printing speed and a fixed scanning line density, which is the density of the scanning lines per unit time, in the same way as in the ordinary electrostatic type copying machine, owing to the necessity of controlling the photoreceptor drum 15 at a constant speed. As regards the scanning line density, 240 dots/inch (dpi) to 300 dpi used to be common among the laser beam printers in the initial period, but laser beam printers capable of attaining 400 dpi to 600 dpi have recently been forming a dominant current. This trend of development is in line with the progressive diffusion of the so-called desk top publication along with the recent ever-increasing acceptance of input/output equipments for processing picturer image information at a significant step forward marked in departure from the former practice of primarily printing text information with such equipments. Also for text information, printers or the like are required to fulfill the needs of smoothing of fonts, and there has arisen a tendency to give preference to outline fonts.

In the current state of affairs marked by progressive improvements achieved on the quality of printed images as mentioned above, the processing of images in a laser beam printer becomes more complicated to that extent and also the number of scanning lines is increased as much. In this situation, it is an actual state at present that the printing speed of laser beam printers has not yet attained any considerable improvement even though various kinds of techniques have thus developed. Therefore, as the amount of work increases in an office equipped with a laser beam printer, it becomes necessary to install an additional laser beam printer, which presents the problem that the need causes a heavier economic burden on the operating expenses.

Also, there has been another problem that a larger capacity has come to be required of the page memory for storing the images for one page along with the improvements on the quality of images to be printed and that this requirement has given considerable influence to the costs of laser beam printers.

Moreover, there has been still another problem that a laser beam printer, which processes picture image information in addition to text information, takes a considerably longer time in its processing of picture image information than in the processing of text information, so that considerable fluctuations occur in the amount of time required of such a printer from the start of the processing of information to the finish of printing, depending on the contents of information to be printed.

SUMMARY OF THE INVENTION

Therefore, an object of the present invention is to offer a laser beam printer which is capable of increasing its printing speed to a higher rate in case it is not considered to be so important to secure high quality in the printed images.

Another object of the present invention is to offer a laser beam printer which is capable of finishing a printing operation in an almost equal duration of time, regardless of the nature and particulars of the images to be printed.

Still another object of the present invention is to offer a laser beam printer which is capable of performing its processing of images for printing with a plural number of line memories without using any page memory.

In order to attain the above objects, the present invention provides a laser beam printer including speed decoding means for decoding a specification of a printing speed, and speed setting means for setting a transport speed for a sheet of paper taken as an object of recording in accordance with decoded contents of the printing speed.

BRIEF DESCRIPTION OF THE DRAWINGS

The manner by which the above objects and other objects, features and advantages of the present invention are attained will be fully evident from the following detailed description when it is considered in light of the drawings, wherein:

FIG. 6 (a) and FIG. 6 (b) are waveform charts comparing the states of occurrence of the video clock at the two kinds of printing speed;

FIG. 8 (a) through FIG. 8 (d) are timing charts illustrating the relationship between horizontal synchronizing signals and image information;

FIG. 9 is a flow chart for explaining the processing steps relating to the setting of the scanning density and the printing speed, and the determination of a cyclic period of the horizontal synchronizing signal;

FIG. 15 (A), FIG. 15 (B), and FIG. 15 (C) are charts illustrating a third example of the condition of printing with the same laser beam printer;

DETAILED DESCRIPTION OF THE PREFERRED EMBODIMENTS

Figure 1:
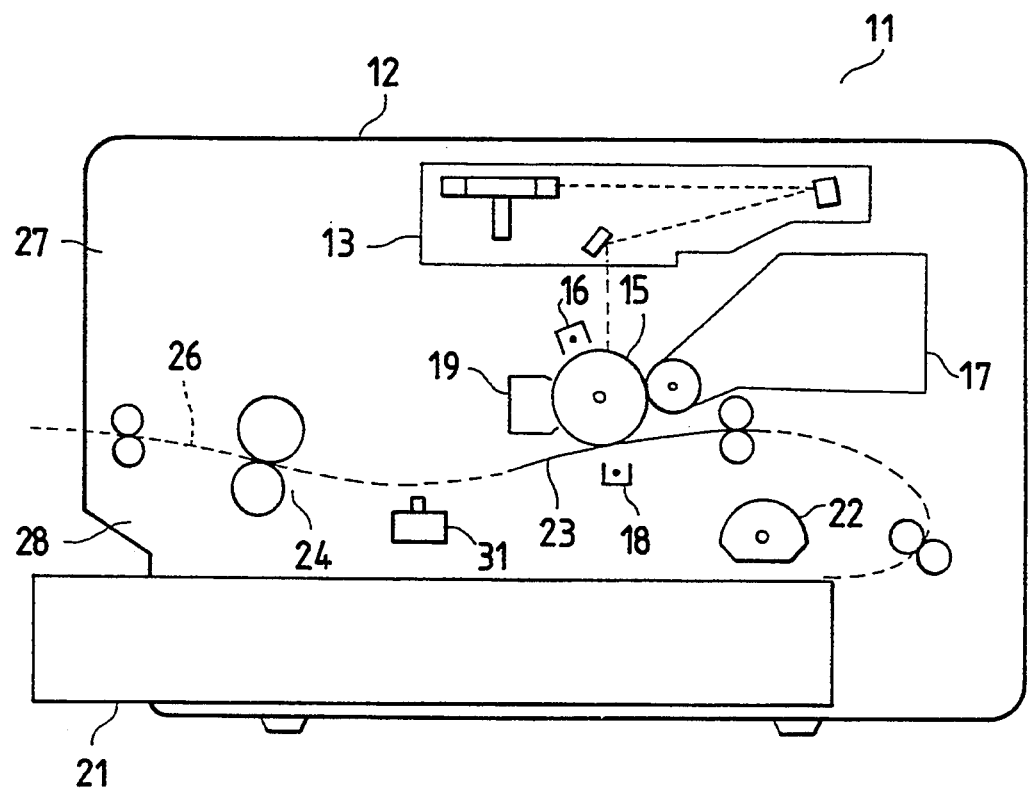
FIG. 1 is a schematic diagram illustrating an example of a conventional laser beam printer.

Now, reference will be made in detail to the construction of preferred embodiments of the present invention as illustrated in the accompanying drawings, in which like reference characters specify like or corresponding parts throughout the several drawings.

In the description to follow, some embodiments of the present invention will be used as examples. It should be understood, however, that the present invention is not limited to these examples of its embodiment, but may be applied effectively to other forms of its embodiment to such an extent as will not deviate from the technical scope defined for the present invention.

Figure 2:
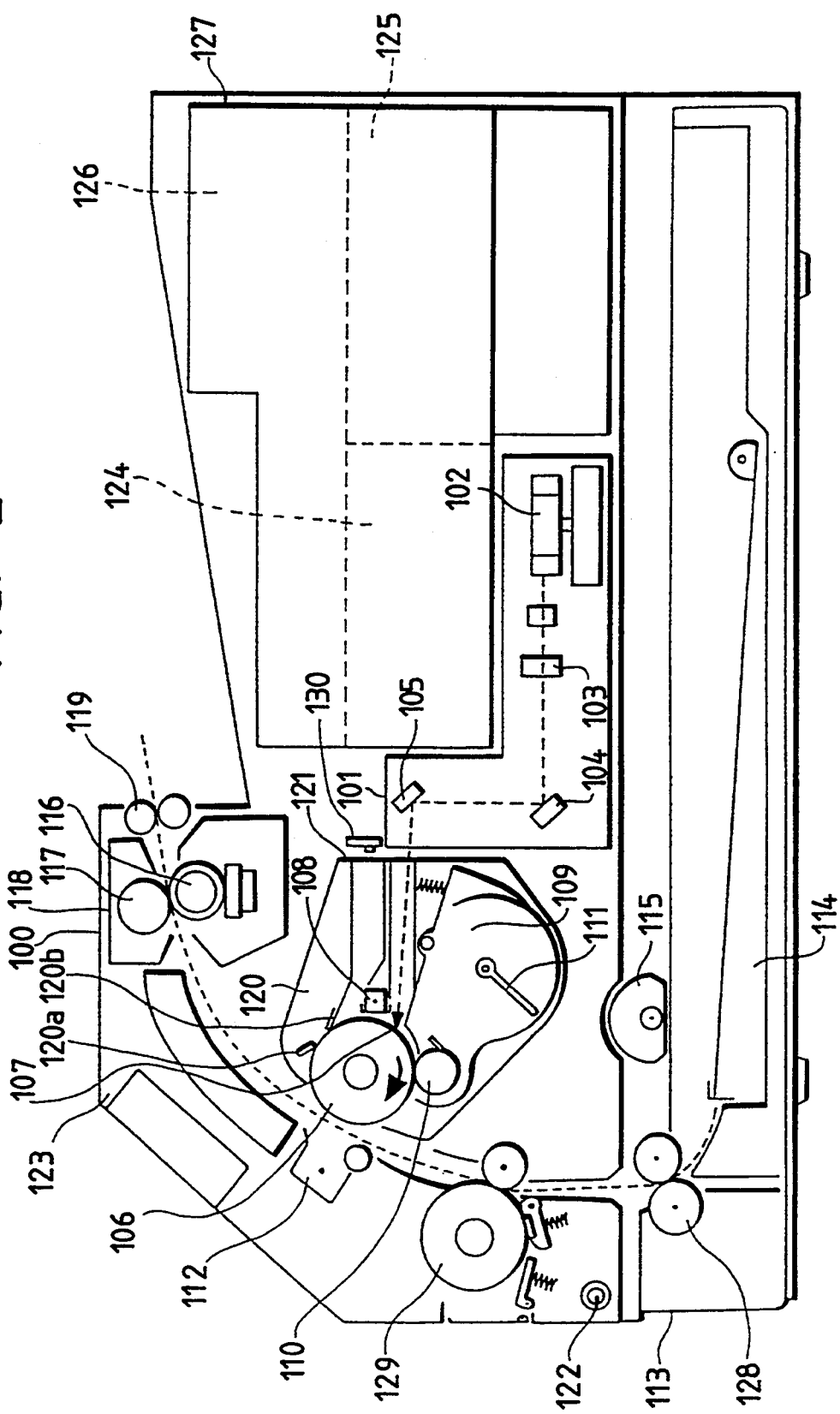
FIG. 2 is a schematic diagram illustrating a laser beam printer according to a first embodiment of the present invention.

FIG. 2 illustrates an outline of the construction of a laser beam printer according to a first embodiment of the present invention. It is to be noted in this regard that FIG. 2 shows this laser beam printer as viewed from one side, and the front of the laser beam printer is shown in the left area of the drawing.

This laser beam printer 100 is provided with a laser scanning unit 101. A semiconductor laser for generating a modulated laser beam in accordance with the image signals is arranged on the laser scanning unit 101 though the laser is not shown in FIG. 2. A laser beam emitted from this semiconductor laser is incident on a polygon mirror 102 and deflected in accordance with the rotation of this mirror. The deflected laser beam passes through an $f\theta$ lens 103 and is fed out of this laser scanning unit after the moving direction of the beam is changed by mirrors 104 and 105.

A photoreceptor drum 106, which rotates at a predetermined constant speed in the arrow-marked direction, is arranged on a line as extended from the laser beam output from the laser scanning unit 101. The laser beam output from the laser scanning unit 101 performs repeated scanning operations on a predetermined exposure position 107 of the photoreceptor drum 106 in its axial direction, i.e. in the main scanning direction. A charge corotron 108 is arranged, in opposition to the photoreceptor drum 106, at a slightly former position from the exposure position 107, and this charge corotron 108 is constructed in such a manner that it gives uniform charging to the surface of the photoreceptor drum 106. A latent electrostatic image is formed in correspondence with the image information on the surface of the drum with a laser beam irradiated on the photoreceptor drum 106 as thus charged. This latent electrostatic image is developed by a developing unit 109, which works on the latent image on the drum surface at the downstream side from the exposure position. This developing unit 109 includes such component parts arranged therein as developing rolls 110, which magnetically sets up the particles of the toner for properly executing the development of the latent electrostatic image, and a toner feeding mechanism 111, which feeds the toner contained in a cartridge to the developing rolls 110. A predetermined developing bias is applied to the developing rolls 110.

A toner image formed by the development by the developing unit 109 moves by the rotation of the photoreceptor drum 106 to a position where the image is set in confrontation with a transfer corotron 112 and is then transferred electrostatically onto the recording paper (which is ordinary printing paper) there. In this regard, the charge corotron 108 and the transfer corotron 112 which are employed in this embodiment are constructed in such a way that a single corotron wire is suspended in a space covered with shielding material, with a voltage applying terminal provided to one end of the wire.

Next, a brief description will be made of the transport path for the recording paper. Sheets of the recording paper, which are not shown in the drawing, are to be piled up in a cassette tray 114, which is inserted from the front area into a paper feeding unit 113 arranged detachably in the lower portion of the laser beam printer 100. The sheet of the recording paper which is placed on top of the uppermost layer of the paper in the cassette tray 114 is delivered out of the cassette tray 114 by means of semilunar rollers 115. Moreover, another means, such as retarding rolls, may be used instead of the semilunar rollers 115.

The sheet of the recording paper which has been thus fed out is transported forward by transport rolls 128 via the path indicated with the broken line, and, at the moment when the paper has arrived at the fore end of the regist roll 129, the paper is stopped temporarily from its forward travel. Thereafter, an electromagnetic clutch, which is not shown in the drawing, starts the rotation of the regist roll 129, keeping the rotation of the regist roll 129 in synchronization with the rotating position of the photoreceptor drum 106, and the recording paper is thereby passed in this manner at a desired timing between the photoreceptor drum 106 and the transfer corotron 112. Only at the point of time when the recording paper is thus passed, the transfer corotron 112 gives an electric discharge, by which the toner image on the photoreceptor drum 106 is sucked electrostatically in the direction of the transfer corotron 112, and the toner image is thereby transferred onto the recording paper. The recording paper with the toner image thus transferred thereonto is processed for the removal of electric charge from it by means of a not shown charge eliminating stylus or erasure stylus, which is arranged at the downstream side of the transfer corotron 112, and is peeled off from the surface of the drum. The recording paper thus peeled off is transported over the transport path of a predetermined length in order to relieve the paper of its strain and is thereafter carried to a fusing unit 118, which is comprised of a pair formed of a heat roll 116 and a pressure roll 117. In the fusing unit 118, the recording paper is passed through a slit formed between the heat roll 116 and the pressure roll 117. At this time, the surface of the recording paper at the side onto which the toner image has been transferred is set at the side of the heat roll 116 while the pressure roll 117 presses the recording paper onto the heat roll 116, thereby making it possible to transfer heat in a highly efficient manner. The heat roll 116 is controlled to maintain a constant level of high temperature. In this state, the toner image on the recording paper is thermally fixed on the surface of the recording paper.

An exit roll 119 is provided at the exit side of the fusing unit 118, and the recording paper transported to this exit roll is discharged to the upper area of the laser beam printer 100. The recording paper is discharged with the recorded surface looking downward as it is transported via the path described above, so that it will be possible to staple the sheets of paper in their discharged sequence by means of a stapler as they have been printed one page after another.

On the other hand, a remaining toner image which has not been transferred onto the recording paper is removed from the surface of the drum by a cleaning device 120 which is arranged at the further downstream side of the transfer corotron 112. The cleaning device 120 is provided with a blade 120b, which is used for scraping off the toner from the surface of the drum, and with a film 120a, which is used for preventing a leak of the toner.

In this regard, the photoreceptor drum 106, the cleaning device 120, the charge corotron 108, and the developing unit 109 are constructed in an integrated structure as an EP cartridge 121 in the laser beam printer 100 in this embodiment. Also, the laser beam printer 100 described in this embodiment has a front cover 123, which opens and closes by its motion centering around a hinge 122. By opening this front cover 123, the user is enabled to remove a paper jam and to replace the EP cartridge and the transfer corotron 112 with extremely great ease. The laser beam printer 100 in this embodiment is constructed in such a manner that it enables the user to install or to remove the fusing unit 118 with considerable ease.

A power source block 124 which consists of a low voltage power source and a high voltage power source is installed in a position behind the laser scanning unit 101 and supplies the necessary electric power to the individual component parts. A control unit 125 is arranged behind the power source block 124 and performs electrical control over the laser beam printer 100. In a position above the power source block 124 and the control unit 125, an image information processing unit 126 is installed, and this unit 126 is constructed in such a way that it translates the image information received from the computer, etc. into a language for the laser beam printer 100 and then transmits the translated information to the control unit 125.

As described above, the laser beam printer 100 in this embodiment has the so-called mechanical component parts arranged in its front area and the so-called electrical component parts arranged in its rear area.

Figure 3:
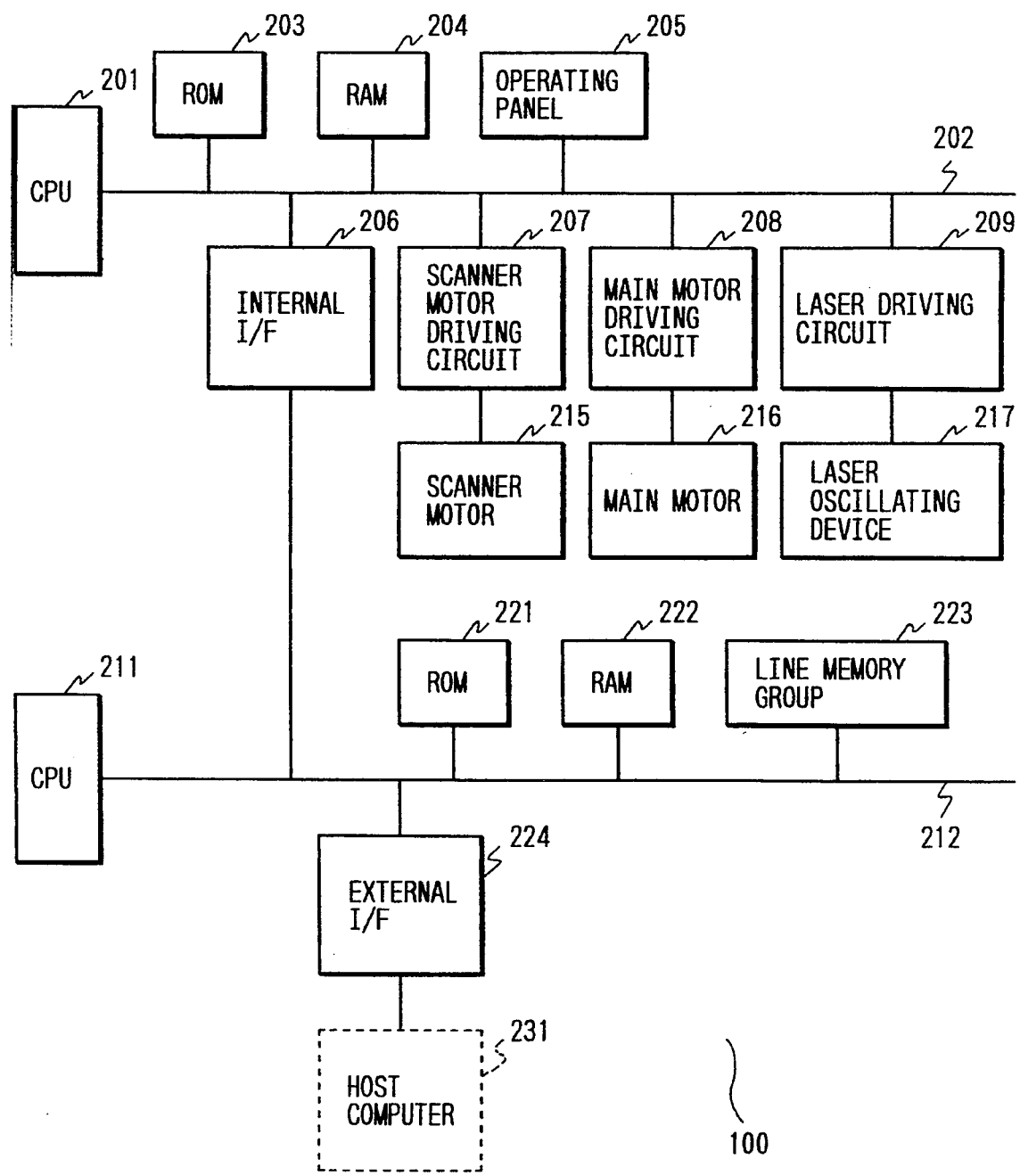
FIG. 3 is a block diagram illustrating the principal parts in the circuit construction of the laser beam printer shown in FIG. 2.

FIG. 3 illustrates the principal parts in the circuit construction of the laser beam printer. This laser beam printer 100 is equipped with a first Central Processing Unit (CPU) 201 for its execution of the ordinary operations as a printer. The first CPU 201 is connected via an internal bus 202 to such circuits or elements as a ROM 203, a RAM 204, an operating panel 205, an internal interface (I/F) circuit 206, a scanner motor driving circuit 207, a main motor driving circuit 208, and a laser driving circuit 209.

Here, the ROM (Read Only Memory) 203 stores programs for the execution of the ordinary control operations on this laser beam printer. The RAM (Random Access Memory) 204 is so designed as to store the temporary data needed for performing control over the laser beam printer. The operating panel 205 is connected by way of a not shown I/O port, designed for use in entering the necessary data by operations on the keys and for displaying the data to be informed to the operator on a not shown liquid crystal display panel. The internal interface circuit 206 is connected via another internal bus 212 to a CPU 211, which is provided for its exclusive use for the processing of images.

The scanner motor driving circuit 207 is a circuit which drives a scanner motor 215 provided for driving the polygon mirror 102 illustrated in FIG. 2. In this embodiment, the polygon mirror 102 is constructed in such a manner that it is controlled to perform its rotation at a constant speed at all times without any relationship to the transporting speed for the recording paper. The main motor driving circuit 208 is so constructed as to perform control for driving a main motor 216. Here, the main motor 216 is used not only for the rotation of the photoreceptor drum 106 illustrated in FIG. 2, but also for the transport of the recording paper. The laser driving circuit 209 connects a laser oscillating device 217 for irradiating a laser beam on the polygon mirror 102. The laser oscillating device 217 is designed in such a way that it is capable of controlling the oscillating output from the laser in two stages in order to change the diameter of the laser beam.

In the meanwhile, the CPU 211, which is provided for processing images, is connected via the internal bus 212 to the internal interface circuit 206, a ROM 221, a RAM 222, a line memory group 223, and an external interface circuit 224. Here, the ROM 221 stores control programs for processing images. The RAM 222 temporarily stores the data necessary for performing control over the processing of the images. The line memory group 223 is comprised, for example, of twelve line memories. The external interface circuit 224 is connected with a host computer 231 which gives instructions concerning the feeding of image signals and the printing of images.

Incidentally, with instructions given by the host computer 231 or by operations on the operating panel 205, this laser beam printer can also be set (a) to change the scanning line density to either of the two types, i.e. high density and low density, at the time of printing, and (b)

to make an automatic change of the transporting speed for the recording paper in accordance with the contents of the image information. In this regard, the laser beam printer in this embodiment performs a printing operation at 600 dpi in the state in which the scanning line density is set at "high" and performs a printing operation at 300 dpi in the state in which the scanning line density is set at "low".

Figure 4:
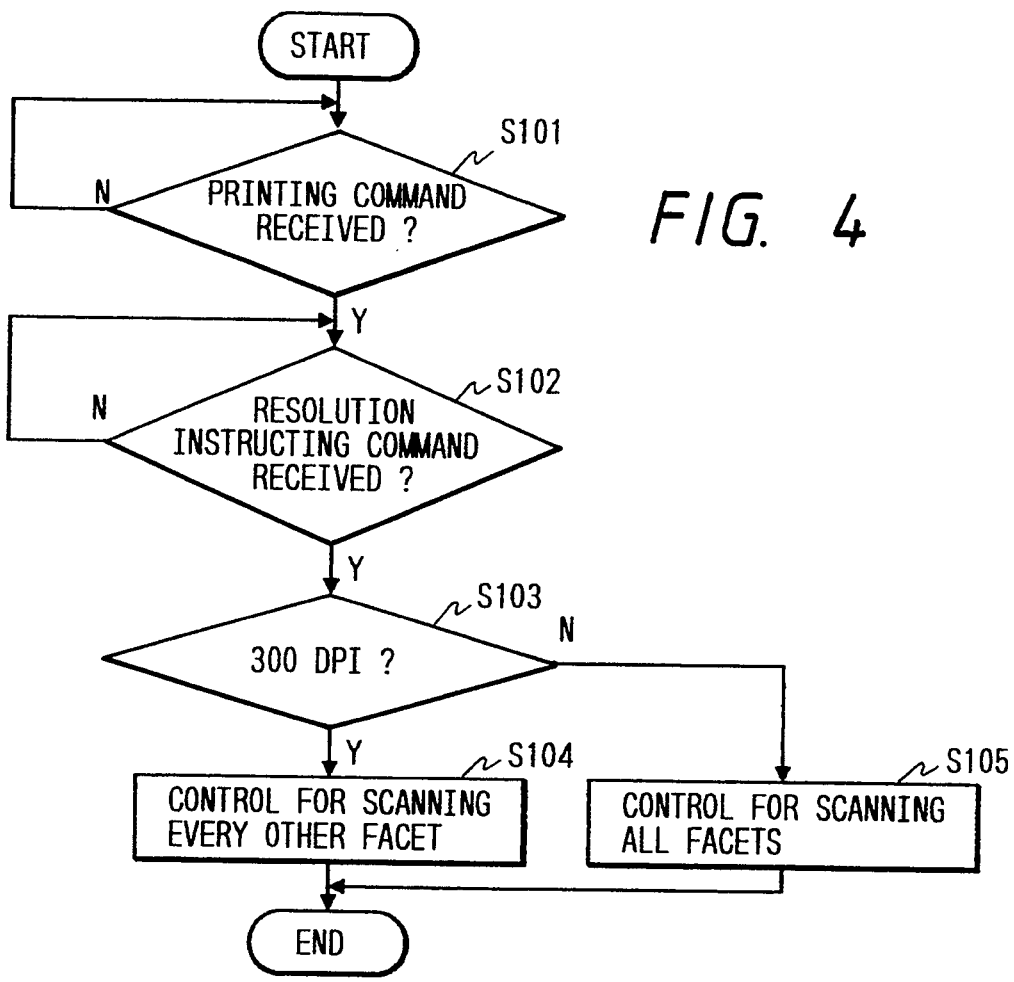
FIG. 4 is a flow chart illustrating the flow of control to be performed in case a changeover is to be made of the scanning line density.

FIG. 4 illustrates an outline of the control performed on the laser beam printer in case a change in the scanning line density is instructed from the side of the host computer. In this case, the CPU 211 of the laser beam printer, having had the arrival of a printing command from the host computer 231 via the external interface circuit 224 (in step S101; Y), receives a resolution instructing command out of the printing command (in step S102; Y), and judges whether the received resolution instructing command indicates 300 dpi or not (step S103). If the CPU 211 of the laser beam printer finds that the resolution, namely, the scanning line density, as instructed is 300 dpi (Y), it causes the scanning unit to scan every other facet of the polygon mirror 102 (step S104), i.e. to scan the facets of the polygon mirror 102, omitting one out of every two facets of the polygon mirror 102, as described in detail later.

In contrast to this mode of operation, the CPU 211 of the laser beam printer performs the ordinary control which causes the scanning unit to scan all the facets of the polygon mirror 102 (step S105) in case the instructed resolution is other than 300 dpi, i.e. 600 dpi (in step S103; N).

In the control illustrated in FIG. 4, it is taken as a premise that the recording paper is transported at a certain constant speed, and it is also taken as a premise that, after such a printing command is issued, the scanning line density will not be changed until the printing operation is finished.

In contrast to this, the transporting speed for the recording paper can be fixed at a certain constant speed and only the number of the scanning lines per unit time can be changed in case a printing command relating to the resolution is issued for the line as the unit or for the block as the unit, in which one block consists of a given plural number of lines. In this case, the control flow can be organized in such a way that the control is performed for a shift between scanning every other facet (step S104) and scanning all the facets (step S105) on the basis of a recognition of changes in the resolution instructing command.

Figure 5:
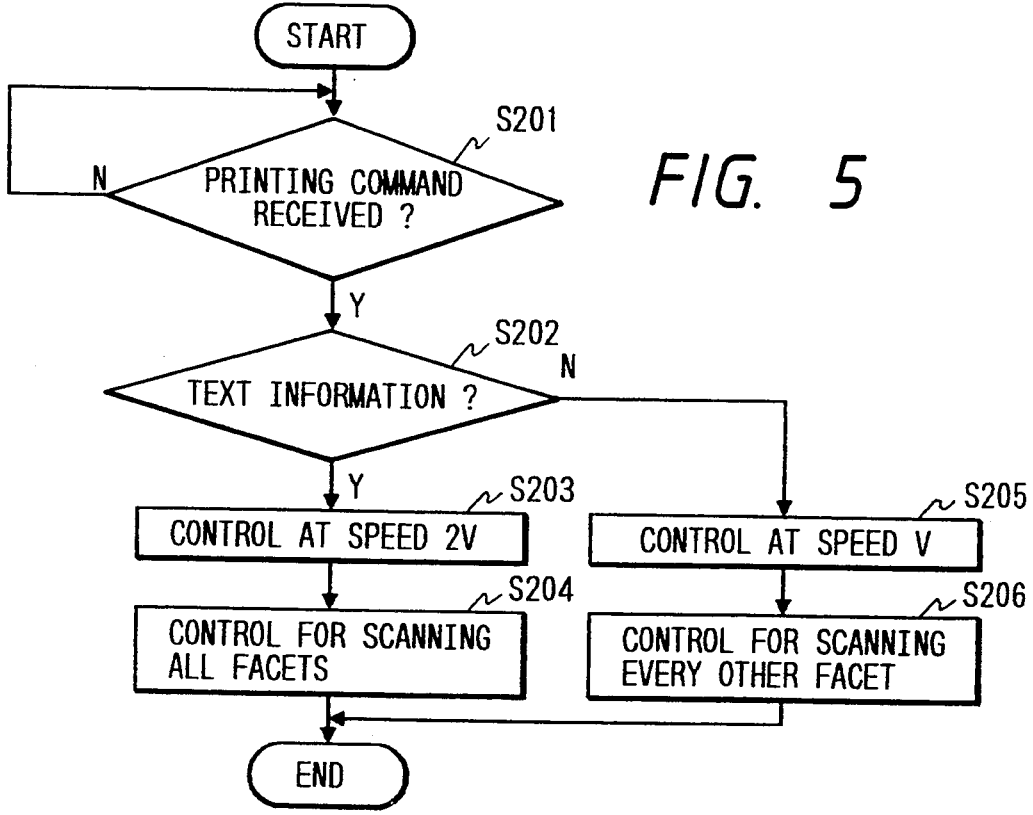
FIG. 5 is a flow chart illustrating the flow of control to be performed in case a change over is to be made of the printing control in accordance with the contents of the image information.

FIG. 5 illustrates one example of control operations to be performed in case the laser beam printer performs automatic control of its printing operations in accordance with the kind of picture information which comes transmitted from the host computer. In this example, the laser beam printer discerns whether the transmitted image information is text information or picture information (step S202) when it has received a printing command (in step S201; Y) from the host computer 231. Then, in case the image information is text information composed of such code information as characters, it is possible to perform the operations within the laser beam printer at a relatively faster speed, and the control for the transport of the recording paper will therefore be started (step S203) for the printing speed of 2V (wherein V represents a prescribed speed). Moreover, the polygon mirror 102 will have all its facets as scanned by the laser beam (step S204) in this case.

On the other hand, the processing time will be relatively longer in case the image information received from the host computer 231 is picture information (in step S202; N) as the processing of information is performed by the bit as the unit. Therefore, control is performed in this case for the transport of the recording paper at the printing speed V (step S205), which corresponds to one half of the speed for the text information. At this time, no change occurs in the rotating speed of the polygon mirror 102. Therefore, when scanning is performed on every other facets of the polygon mirror (step S206), the scanning line density will then be the same as that in the case of text information.

Now, it is assumed here that the number of facets on the polygon mirror 102 is 2N for the laser beam printer in this embodiment. Moreover, as for the transport speed for the recording paper, namely, the printing speed in the subsidiary scanning direction, it is possible to select either of V mm/sec. and 2V m m/sec., as described above.

In the laser beam printer in this embodiment, the number of revolutions of the scanner motor 215 are set in proper adjustment to the printing speed 2V. Therefore, the number of revolutions n of the scanner motor 215 can be expressed by the following equation (1), wherein f represents the scanning line density per 1 mm of the recording paper:

$$n = \frac{2V \times f \times 60}{2N} \text{ [rpm]} \tag{1}$$

Therefore, when the video frequency employed for the processing of signals by the pixel as the unit in a laser beam printer is expressed as F [Hz], this can be expressed by the following equation (2):

$$F = 2V \times f^2 \times w \tag{2}$$

Wherein, w represents the total scanning width (mm).

It is assumed that a command for selecting the printing speed V is given to the laser beam printer 100 in this state from the host computer 231, which is typically a personal computer. The CPU 201, which is shown in FIG. 3, receives this command via the internal interface circuit 206 and selects the data stored in the ROM 203 for realizing the printing speed V.

Such data indicate that (1) the polygon mirror 102 should be scanned at every other facet, (2) the revolving speed of the main motor 216 should be set at one half of its revolving speed at work in the case of the printing speed 2V, and (3) the control timing on the other items including the transport of the recording paper should be adjusted in such a way that they will simply be two times as much as their values in the case of printing at the printing speed of 2V. However, the period from the time when the sensor which sets the starting position for the picture signal on the occasion when the laser beam performs a main scanning operation has detected the laser beam to the time when the image signal is started is set at exactly the same value as in the case of the printing speed 2V. This is due to the fact that no change is made in the number of revolutions itself of the polygon mirror and that, if this period of time were set at two times as much as that for the case in which the printing speed is 2V, there would arise the problem that the starting position of the image signal on each line would be different from the case of the printing operation at the printing speed 2V.

When the CPU 201 has read out the data suitable for the printing speed V from the ROM 203, the CPU 201 performs control over the various parts in accordance with the data thus read out. Also, when image information comes transmitted from the host computer 231, the CPU 211 divides the line memory group 223 into two sub-groups, writing the image information for one line after another to the plural number of line memories belonging to one sub-group while reading the image information for one line after another out of a similarly plural number of line memories belonging to the other sub-group. The control of the line memory group 223 by the CPU 211 is performed by this sub-group as the unit, so that the reading of image information out of a sub-group will be started when the writing of picture information to the other sub-group is completed, and, at the same time as this, the writing of image information to the other sub-group is started. The operations are thereafter continued in the same manner.

Incidentally, when control is performed at the printing speed V, the polygon mirror 102 rotates at the same rotating speed as in the case of its rotation at the printing speed 2V, and also the video frequency will be set at the same frequency as that set in the case of operation at the printing speed V. Therefore, in order to set the scanning line density in the case of the operation at the printing speed V at the same scanning line density in the operation at the printing speed 2V, the scanning operation on every other facet is to be performed as mentioned above.

Now, it is assumed that the number of sheets of paper printed per one minute by the laser beam printer at the printing speed V is expressed as $A_1$. Moreover, it is assumed that the length of the recording paper is expressed as L (mm), and that the interval between two sheets of the recording paper transported in succession in the transport path is expressed as $\Delta L$. Then, the number of sheets of the paper printed per minute $A_1$ can be found by the following equation (3):

$$A_1 = \frac{60V}{L + \Delta L} \text{ [sheets/minute]} \tag{3}$$

On the other hand, the laser beam printer will perform the predetermined control for the printing operation at the printing speed 2V in case a command is issued to the effect that the printer should perform printing at the printing speed 2V. That is to say, the laser beam will be modulated for each of the facets of the polygon mirror 102, and the laser beam printer will attain the number of sheets printed per minute $A_2$ as expressed in the following equation (4):

$$A_1 = \frac{60 \times 2V}{L + \Delta L} \text{ [sheets/minute]} \tag{4}$$

FIG. 6 (a) and FIG. 6 (b) respectively express the video clock for performing the control of the scanned facets of the polygon mirror in relationship to the printing speed. FIG. 6 (a) illustrates the case of such control in the case where the printing speed is V, and the video clock 251 is generated for the scanning time for each single line with the times $t_1, t_2, t_3, \ldots$, which correspond to the individual scanned facets, as the starting times.

In contrast to this, FIG. 6 (b) illustrates the case in which the printing operation is performed at the printing speed 2V. In this case, the video clock 252 is generated for the scanning time for a single line in an intermittent manner for the first facet, third facet, fifth facet, . . . . . . . of the polygon mirror 102 (FIG. 3) with the time $t_1, t_3, \ldots\ldots$ as the starting times. That is to say, this example shown in FIG. 6 (b) does not have any video clock generated on the line starting at the time $t_2$ because a gate circuit not illustrated suppresses the occurrence of a video clock. Therefore, no formation of images is performed on this particular line.

Consequently, in the case of the printing speed V as shown in FIG. 6 (a), a scanning operation is performed on the second line at the time $t_2$ if a scanning operation is performed on the first line at the time $t_1$. Yet, in the case of the printing operation at the printing speed 2V as shown in FIG. 6 (b), the scanning of the second line will be performed at the time $t_3$ if the scanning of the first line is performed at the time $t_1$.

Next, a description will be supplemented with respect to the control for effecting a changeover between the scanning line densities. In case a command relating to the scanning line density f has been issued by the host computer 231, the number of revolutions n of the scanner motor 215 will be given by the equation (1) cited above. In this example, the scanning line density f is "300". On this occasion, the laser beam printer performs scanning operations on every other facet of the polygon mirror 102. Accordingly, the scanning line density f is given by the following equation (5).

$$f = \frac{N \times n}{2V \times 60} \text{ [sheets/minute]} \tag{5}$$

On the other hand, the laser beam printer performs scanning operations on all the facets of the polygon mirror if the host computer 231 issues a command in requirement of the scanning line density 2f. The scanning line density 2f on this occasion is given by the following equation (6).

$$2f = \frac{2N \times n}{2V \times 60} \text{ [sheets/minute]} \tag{6}$$

Thus, a scanning line density two times as much will occur in the subsidiary scanning direction on the recording paper.

In this example where a changeover is made between scanning line densities, it is taken as a premise that the transport speed for the recording paper will not be changed for the operations before and after the changeover, as mentioned above. Therefore, there may be some cases in which line intervals become too wide apart, depending on the individual printers, when the printing operation is performed with the scanning line density f. In such a case, it is recommended to make the spot diameter of the laser beam as projected on the photoreceptor drum 106 substantially larger by increasing the power of the laser beam to a higher level for the scanning density f than when the printing operation is to be performed at the scanning line density 2f.

As described above, the laser beam printer in this embodiment will gain the benefit of a considerable reduction of the capacity of the buffer memory, which stores image information at the time of printing, because the printing speed will be increased for text information, for which the processing speed is high, and the printing speed can be accelerated for picture information, for which the processing speed is low, provided that a changeover between the printing speeds is furnished by the method illustrated in FIG. 5 in consideration of the data processing speed in the printer. In specific terms, such a system will render it unnecessary to perform the processing of picture images by the page as the unit, with a page memory provided for it as in the conventional practice, so that it will be possible to print images simply by using a plural number of line memories as described in the embodiment given above.

Also, control data are written to the ROM 203 for performing control of the changeover of the printing speed and the scanning line density, and it is therefore possible to perform the control with ease and additionally it is possible also to make a change in the contents of the control in an easy and simple way by rewriting the contents of the ROM or by replacing the ROM.

Moreover, it goes without saying that the laser beam printer described above may be constructed in such a way that the scanning unit performs its scanning operation at the scanning line density f in the case of text information while it performs its scanning operation at the scanning line density 2f, which is finer than the scanning line density f, in the case of picture information. In case such a scanning system is employed, the laser beam printer will be able to improve the expressive power of the printed matter by virtue of its capability of reproducing image information in significantly improved quality.

Then, a description will be given with respect to a second embodiment of the present invention. The outline of the construction of a laser beam printer in this embodiment is the same as that of the laser beam printer in the first embodiment (which is illustrated in FIG. 2), and its description is therefore omitted here.

First, a detailed description will be made of the scanning operation performed with a laser scanning unit 101 on a photoreceptor drum 106.

Figure 7:
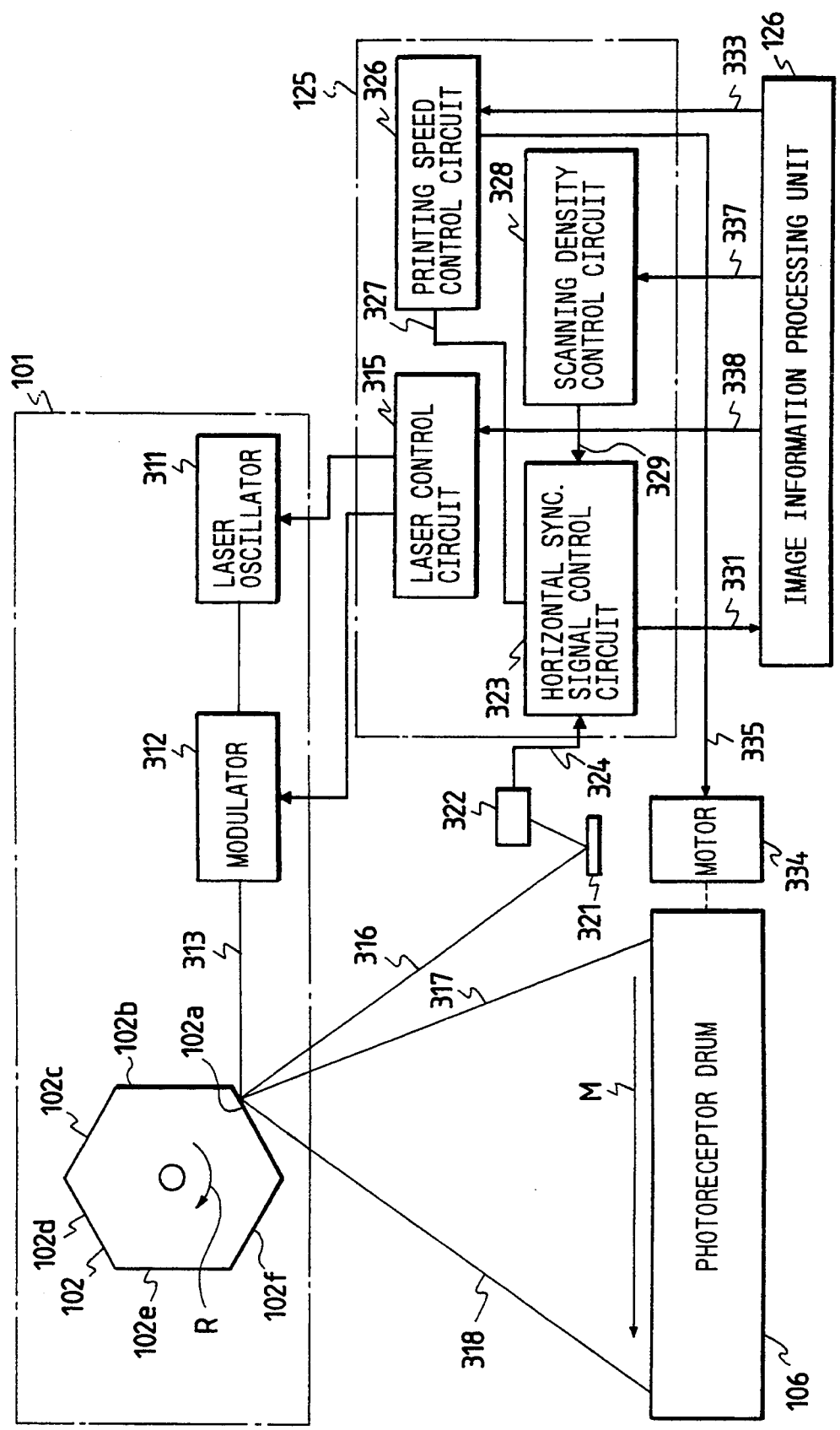
FIG. 7 is a block diagram illustrating the principal parts of a laser beam printer according to a second embodiment of the present invention.

FIG. 7 illustrates those component parts which are related to the scanning operations with a laser beam in the construction of the laser beam printer shown in FIG. 2. However, the parts which are not important for the purpose of the description offered here are omitted from FIG. 7.

A polygon mirror 102 in the laser scanning unit 101 is driven with a driving motor, which is not illustrated in FIG. 7, to perform its rotation in the direction indicated by the arrow mark R at a constant speed. This polygon mirror 102 sequentially deflects a laser beam 313 generated for its incidence upon it from a laser oscillator 311 via a modulator 312, reflecting the incident beam on its six facets 102a through 102f, and then the laser scanning unit with the polygon mirror 102 thus built therein, performs scanning operations at a certain constant speed in the main scanning direction M of the photoreceptor drum 106 through an fθ lens 103 (FIG. 2) mentioned above. Therefore, six main scanning operations in the maximum can be performed by one rotation of the polygon mirror 102.

The laser beam which has been reflected by the polygon mirror 102 has its angle changed by a reflecting mirror 321 at a position 316 and is fed for its incidence upon a beam detector 322. This beam detector 322 is constructed in such a way that it detects the incidence of a laser beam and generates a pulse-form beam detecting signal 324 to a horizontal synchronizing signal control circuit 323 provided in a control unit 125.

The horizontal synchronizing signal control circuit 323 applies a shaping process to the pulse waveform of the beam detecting signal 324 and feeds the shaped signal as a horizontal synchronizing signal 331 to an image information processing unit 126, on which occasion the horizontal synchronizing signal control circuit 323 performs control for thinning out the horizontal synchronizing signal 331, in such a way as to be at prescribed intervals, on the basis of the printing speed information 327 furnished from a printing speed control circuit 326 and scanning density information 329 furnished from a scanning density control circuit 328.

The printing speed control circuit 326 supplies printing speed information 327 on the basis of a printing speed control signal 333 furnished from the image information processing unit 126 and, in addition, feeds a driving speed control signal 335 to a motor 334 for driving the photoreceptor drum 106.

The scanning density control circuit 328 outputs scanning density information 329 on the basis of a scanning density control signal 337 supplied from the image information processing unit 126.

The laser control circuit 315 is constructed in such a way that it performs control of the laser oscillator 311 and the modulator 312 on the basis of the image information 338 fed from the image information processing unit 126.

Moreover, a main scanning operation is performed in a cyclic period equivalent to one sixth of the rotating period of the polygon mirror 102 in correspondence with the period in which each facet of the polygon mirror 102 is set into a position confronting the photoreceptor drum 106. However, the modulation of the laser beam based on an image signal within this main scanning period is done only in the period between the beam position 317 and the beam position 318, but the beam is cut off in any position before or after these beam positions. Yet, in this embodiment, it is designed to produce laser output in a certain predetermined amplitude every time also at the point in time when each of the facets of the polygon mirror 102 has reached such an angle position as will deflect the laser beam 313 to the beam position 316. Accordingly, the beam detecting signal 324 will always be generated for each main scanning operation without any regard to the presence or absence of the supply of an image signal.

The image information processing unit 126 is constructed in such a manner that it receives raw or not-processed image information supplied from a not shown computer, etc., and also receives such printing parameters as the printing speed and the scanning density fed into it. The raw image information thus supplied is converted into image information 338 suitable for the required printing condition on the basis of the furnished printing parameters, and the image information derived by such conversion is stored in an image memory not shown in the drawing. Then, the stored image information is fed out for a single line at a time in synchronization with the horizontal synchronizing signal 331 furnished from the horizontal synchronizing signal control circuit 323 in the control unit 125.

The reason why a conversion of data is done on the basis of the printing parameters is as mentioned below. Specifically, the raw image information supplied by the computer or the like sometimes contains a total number of pixels per page which will not be suitable to the specified scanning density. Therefore, an adjustment is made of the number of pixels by thinning out the pixels for each line or by adding a new line of pixels.

FIGS. 8 (a) through 8 (d) illustrate the relationship in timing between horizontal synchronizing signal 331 fed out of the horizontal synchronizing signal control circuit 323 and the image information 338 furnished from the image information processing unit 126. As shown in FIG. 8 (a), the original horizontal synchronizing signal 331 has a period T equivalent to one sixth of the rotating period of the polygon mirror 102, and, in synchronization with the output timing of this signal, image information 338 for one line (i.e. the area indicated with diagonal lines in FIG. 8 (b)) is supplied to the laser control unit 315 of the control unit 125 (FIG. 7).

Now, a description will be made of the operations of the control unit 125 in the construction described above and its peripheral equipments.

First, with reference to FIG. 9, a description will be made of the operations to be performed, prior to the printing operation, for the setting of the scanning density and the setting of the printing speed, as well as the determination of the period of the horizontal synchronizing signal.

When a computer, which is not illustrated in the drawing, gives the image information processing unit 126 a command for defining the printing parameters (step S301), the image information processing unit 126 decodes the command and feeds out printing speed control signal 333 (FIG. 7) and the scanning density control signal 337 to the printing speed control circuit 326 and the scanning density control circuit 328, respectively (step S302).

Upon reception of those signals, the printing speed control circuit 326 and the scanning density control circuit 328 respectively furnish the horizontal synchronizing signal control circuit 323 with printing speed information 327 and scanning density information 329 (step S303). At this time, the printing speed control circuit 326 determines whether it has been required to set any value different from that of the printing speed set at the present moment (step S304) and outputs the driving control signal 335 to the motor 334 for driving the photoreceptor drum 106, thereby making the motor 334 to change its revolving speed (step S305), when it is required to set a different printing speed (Y).

The horizontal synchronizing signal control circuit 323 determines the period of the horizontal synchronizing signal 331 on the basis of these types of information thus fed into it. Now, the operations for determining this period will be described in detail.

Figures 10, 11:
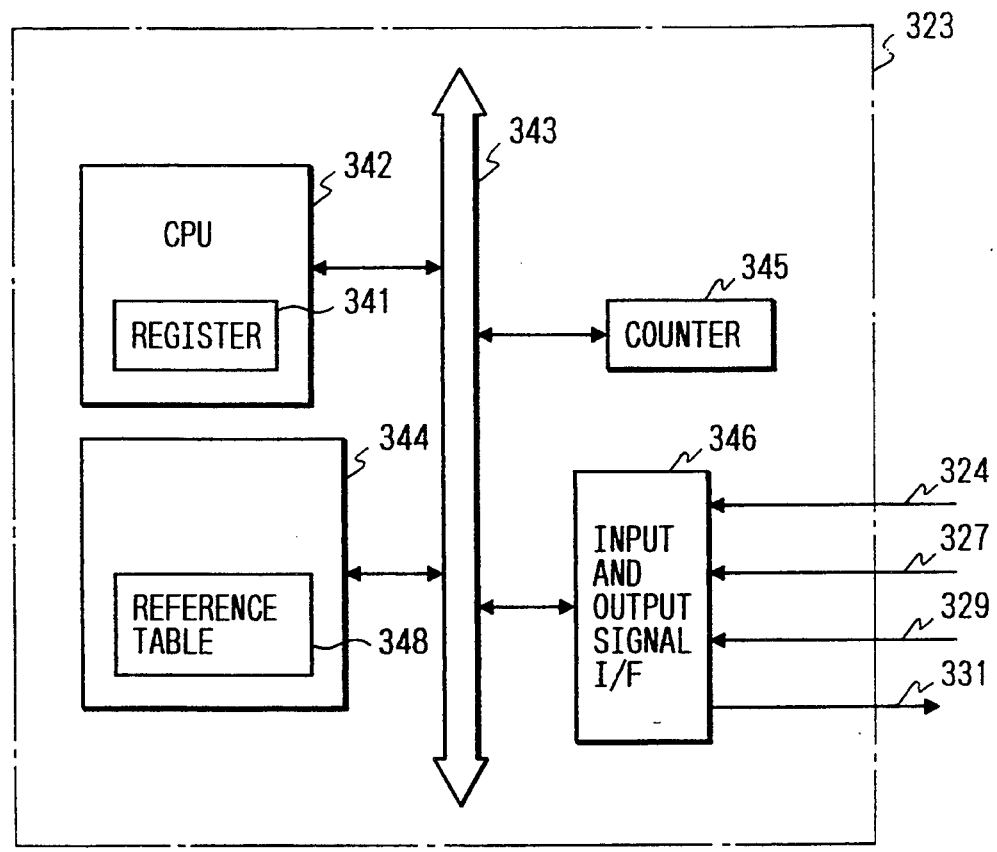
FIG. 10 is a block diagram illustrating the details of the horizontal synchronizing signal control circuit shown in FIG. 7.
FIG. 11 is a chart illustrating the contents of a reference table stored in the memory shown in FIG. 10.

FIG. 10 illustrate the details of the horizontal synchronizing signal control circuit 323. This circuit is provided with a CPU (central processing unit) 342 having a register 341, and connected to a memory 344, a counter 345, and an input and output signal interface circuit 346 via a bus 343.

The beam detecting signal 324 supplied from the beam detector 322, the printing speed information 327 from the printing speed control circuit 326, and the scanning density information 329 from the scanning density control circuit 328 are transferred to the CPU 342 via the input and output signal interface circuit 346, and the horizontal synchronizing signal 331 is output in the meantime via this signal interface circuit 346. The pulse counts of the beam detecting signal 324 thus supplied is counted by the counter 345.

The memory 344 stores a reference table 348 for determining the period of the horizontal synchronizing signal 331.

FIG. 11 illustrates the reference table 348. This table contains the periods of the horizontal synchronizing signal 331 set up therein in correspondence with the various kinds of combinations of scanning density and printing speed. For example, the table indicates that the period of the horizontal synchronizing signal 331 should be set at the basic period T sec. when the scanning density D is 600 dpi (dots/inch) and the printing speed S is 10 ppm (number of sheets of prints/minute). The table also indicates that the period of the horizontal synchronizing signal 331 should be set at 3T sec. when the scanning density D is 400 dpi and the printing speed S is 5 ppm.

Furthermore, this laser beam printer permits a selection of any of the four kinds of scanning density, namely, 600, 400, 300, and 200 dpi, and a selection of either of the two kinds of printing speed, namely, 10 and 5 ppm, and the scanning density of 600 dpi and the printing speed of 10 ppm will be set as the default values in effect after the start-up of this printer.

As it is clearly seen in this table, the scanning density D, the printing speed S, and the period NT of the horizontal scanning signal 331 are always in such a relationship which will satisfy the following equation (7), in which N represents a positive integral number.

$$D \times S \times NT = 6000T \tag{7}$$

Now, when the printing speed information 327 and the scanning density information 329 are fed into the horizontal synchronizing signal control circuit 323 in step S303 shown in FIG. 9, the CPU 342 of this circuit refers to the reference table 348 stored in the memory 344 and extracts a value NT to be employed for the period of the horizontal synchronizing signal 331 (step S306). For example, the period for the horizontal synchronizing signal 331 will be 2T in case the provided scanning density D is 300 dpi and the provided printing speed S is 10 ppm. That is to say, N=2. The CPU 342 sets this value of N in the register 341 (step S307).

The setting of the scanning density and the printing speed and the determination of the period for the horizontal synchronizing signal 331 are completed in the manner described above.

Next, with reference to FIG. 12, a description will be made of the control of the output of the horizontal synchronizing signal 331 by the horizontal synchronizing signal control circuit 323.

The laser control circuit 315 (FIG. 7) controls the laser oscillator 311, working in synchronization with the rotation of the polygon mirror 102 and outputs a laser beam in a short pulse width every time at such a timing that each facet of the polygon mirror 102 arrives at the angle position which corresponds to the beam position 316.

Upon reception of this laser beam, the beam detector 322 applies the beam detecting signal 324 having a predetermined pulse width to the horizontal synchronizing signal control circuit 323.

The CPU 342 (FIG. 10) of the horizontal synchronizing signal control circuit 323 sets 0 in the value C of the counter 345 for counting the number of pulses in the beam detecting signal 324 (step S401) at the same as the start of its operation. The counter 345 increments the count value C (step S403) each time the beam detecting signal 324 is fed into the counter (step S402).

The CPU 342 monitors the count value C (step S404), and, when this value becomes equal to the value N, which is stored in the register 341 (Y), the CPU 342 gives the input and output signal interface circuit 346 the instructions that the circuit should generate the horizontal synchronizing signal 331. Upon reception of such instructions, the input and output signal interface circuit 346 applies shaping or the like to the pulse waveform of any beam detecting signal 324 received as input as of the point of time and outputs the shaped signal as the horizontal synchronizing signal 331 (step S405).

Thereafter, the series of processing operations from step S401 to step S405 will be performed repeatedly until the input of a signal indicating the completion of the printing operation (step S406).

Figure 12:
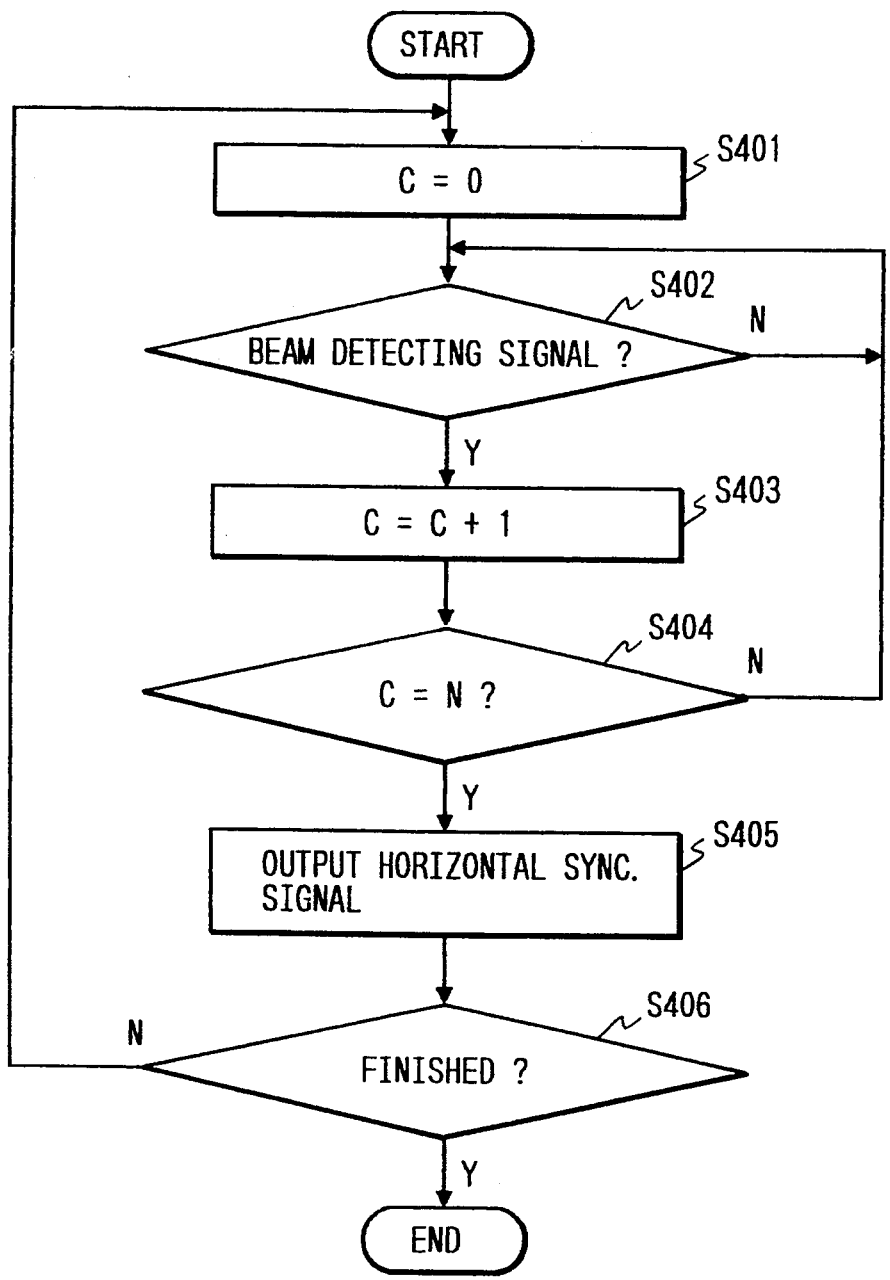
FIG. 12 is a flow chart for explaining the details of the period control for the horizontal synchronizing signal.

In the case of the example described above, the value "2" will be set in the register 341 when the scanning density D is 300 dpi and the printing speed S is 10 ppm, and then the operation shown in FIG. 12 will be performed. Thereby, the horizontal synchronizing signal 331 will be output at the pulse interval 2T, as shown in FIG. 8 (c). This means that the horizontal synchronizing signal 331 is output once each time the beam detecting signal 324 is input twice.

Now, the image information processing unit 126 outputs image information 338 for one line to the laser control unit 315 every time it receives the horizontal synchronizing signal 331 having the pulse interval NT.

When the value N is 2, for example, the image information 338 for one line will be output at the interval 2T, as shown in FIG. 8 (d). Of course, this image information 338 is not the raw image information as it is supplied from the computer, but the information already converted into the data format compatible with the requirement of the scanning density at 300 dpi and the printing speed at 10 ppm and then stored in the memory, as described above.

The laser control unit 315 controls the laser oscillator 311 and the modulator 312 on the basis of the image information 338 furnished to it and then causes the laser beam 313 to be output to the polygon mirror 102.

In case the value N is 2, this laser beam 313 will be reflected, for example, on the first facet 102a, third facet 102c, and fifth facet 102e out of the six facets of the polygon mirror 102 and projected for its incidence upon the photoreceptor drum 106. In other words, the laser beam 313 will not be output at the timing at which the second facet 102b, fourth facet 102d, and sixth facet 102f of the polygon mirror 102 are in any position confronting the photoreceptor drum 106.

In this case, the rotating speed of the photoreceptor drum 106 will be maintained as it is originally by the processing operations in steps S304 and S305 shown in FIG. 9, and, as the result, the printing speed will be remained at 10 ppm while only the scanning density will be changed to 300 dpi, which corresponds to one half of the original scanning density.

Also, in case the specified scanning density D is 600 dpi while the printing speed S is 5 ppm, the pulse interval will be 2T, as observed with reference to FIG. 11. In this case, however, the rotating speed of the photoreceptor drum 106 will be one half of its original rotating speed by the processing operations in steps S304 and S305, so that the scanning density will eventually be maintained at 600 dpi while only the printing speed will be changed to 5 ppm, which is one half of the original printing speed.

In case the specified scanning density D is 300 dpi while the printing speed S is 5 ppm, it is found with reference to FIG. 11 that the pulse interval will be 4T while the rotating speed of the photoreceptor drum 106 will be one half of the original rotating speed. As the result of this, the printing speed is changed to 300 dpi, i.e. one half of the original value, at the same time as the scanning density is changed to 300 dpi, which is one half of the original scanning density value. In this case, moreover, the facets used for the reflection by the polygon mirror 102 will be every fourth facet, such as the first facet 102a, the fifth facet 102e, the third facet 102c, the first facet 102a, . . . . . . .

In case the specified scanning density D is 400 dpi while the printing speed S is 5 ppm, the pulse interval will be 3T, as observed with reference to FIG. 11, while the rotating speed of the photoreceptor drum 106 will be one half of the original rotating speed. As the result, the scanning line density will be changed to 400 dpi, which corresponds to two thirds of the original density value and also the printing speed will be changed to 5 ppm, i.e. one half of the original speed. In this case, moreover, the facets of the polygon mirror 102 to be used for reflection therefrom will be only two facets, i.e. the first facet 102a and the fourth facet 102d.

Figure 13A:
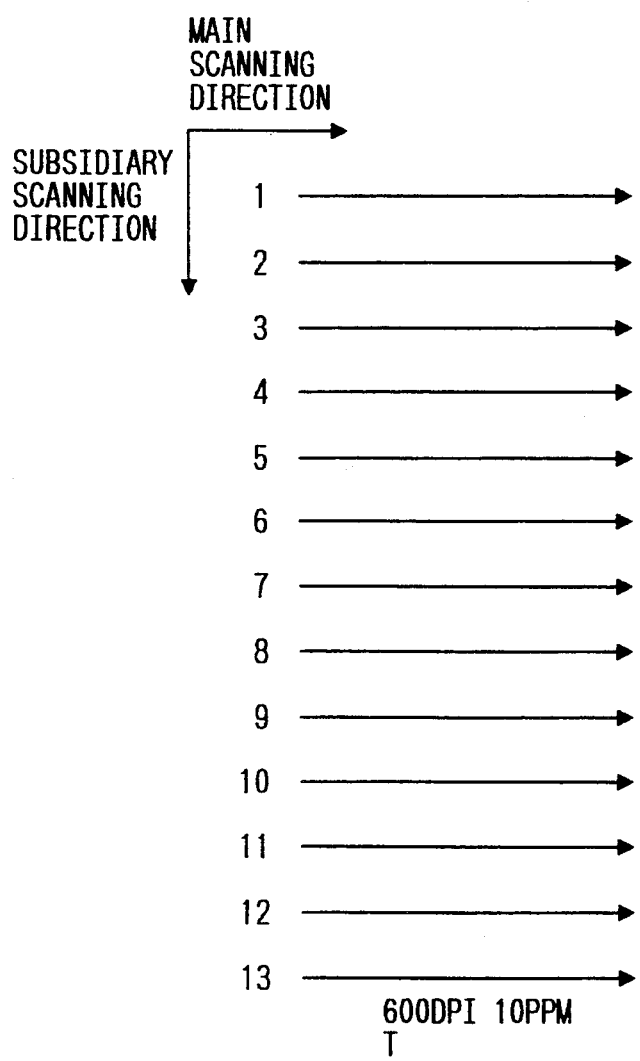
FIG. 13 (A) and FIG. 13 (B) are charts illustrating a first example of the condition of printing with the laser beam printer of the second embodiment of the present invention.
Figure 13B:
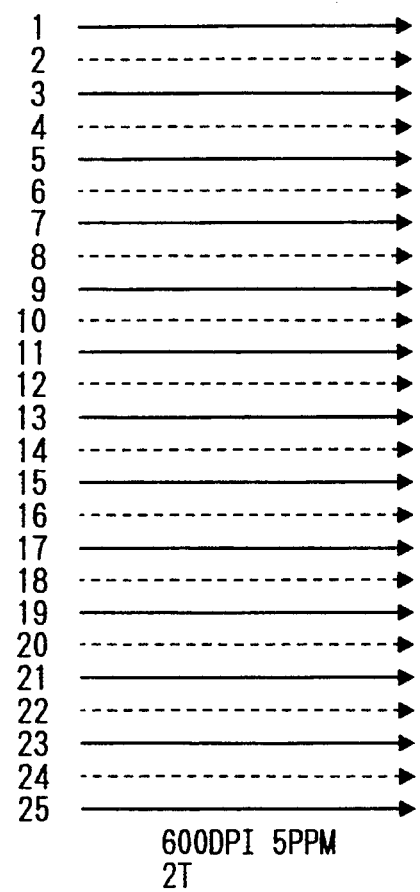

FIG. 13 (A) illustrates the condition of printing at the default values, i.e. 600 dpi in the scanning density and 10 ppm in the printing speed, of this laser beam printer. In this case, the period of the horizontal synchronizing signal 331 is T and all of the six facets of the polygon mirror 102 are used.

FIG. 13 (B) illustrates the condition of printing at the scanning density of 600 dpi and the printing speed of 5 ppm. In this case, the period of the horizontal synchronizing signal 331 is 2T while every other facet of the polygon mirror 102 will be used. Moreover, a bold solid line in the Figures mentioned above indicates a line on which a laser beam is actually irradiated while a broken line indicates a line on which the irradiation is thinned out. The same applies in the same way to the subsequent Figures.

Figures 14A, 14B, 14C:
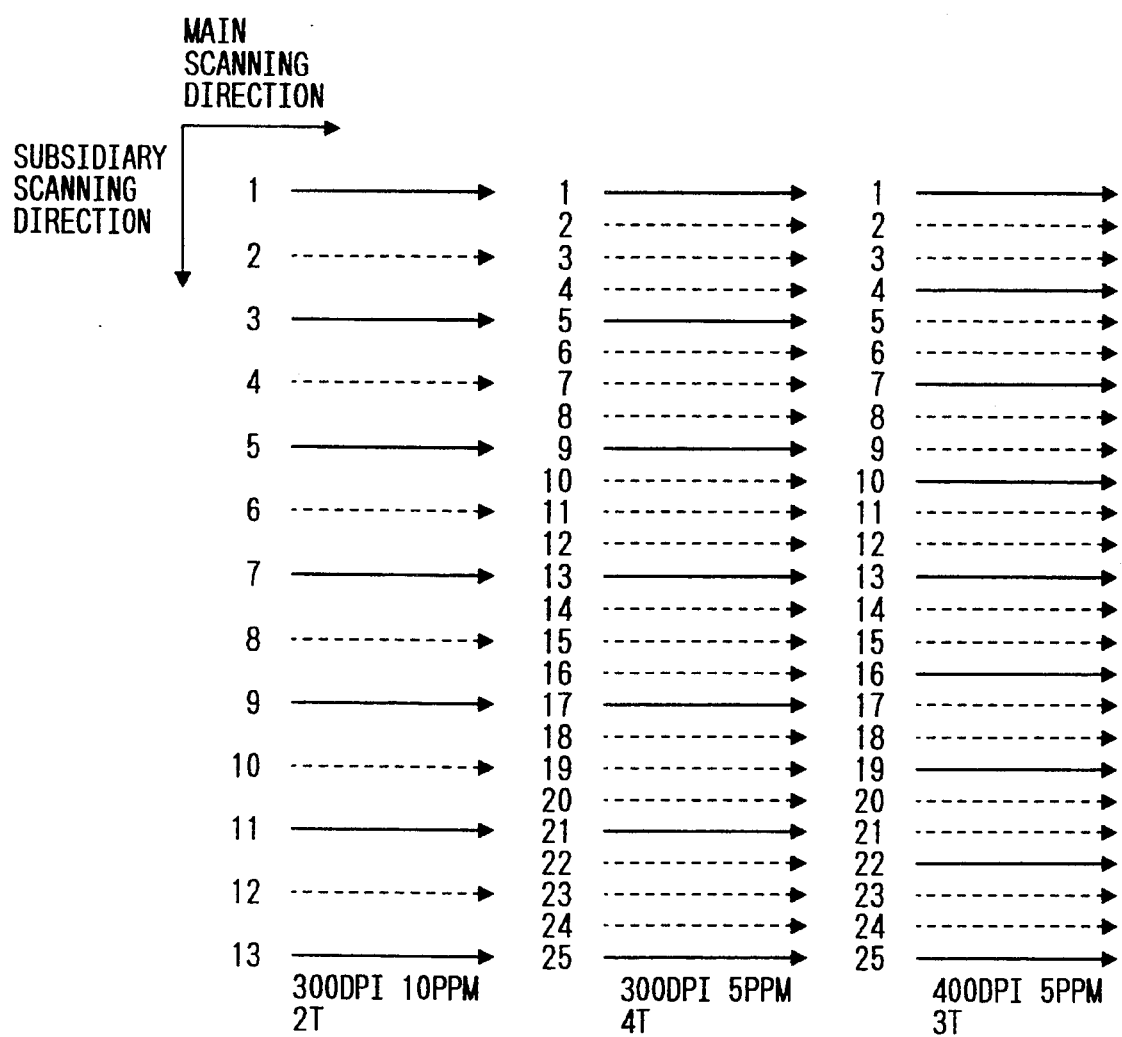
FIG. 14 (A), FIG. 14 (B), and FIG. 14 (C) are charts illustrating a second example of the condition of printing with the same laser beam printer.

FIG. 14 (A) illustrates the condition of printing performed at the scanning density of 300 dpi and the printing speed of 10 ppm. In this case, the period of the horizontal synchronizing signal 331 is 2T, and every other facet of the polygon mirror 102 is used.

FIG. 14 (B) illustrates the condition of printing performed at the scanning density of 300 dpi and at the printing speed of 5 ppm. In this case, the period of the horizontal synchronizing signal 331 is 4T, and every fourth of the facets of the polygon mirror 102 is used.

FIG. 14 (C) illustrates the condition of printing which is performed at the scanning density of 400 dpi and at the printing speed of 5 ppm. In this case, the period of the horizontal synchronizing signal 331 is 3T, and every third of the facets of the polygon mirror 102 is used.

Moreover, this embodiment of the present invention has been described with respect to a system in which the product of the scanning density D, the printing speed S, and the period NT of the horizontal synchronizing signal 331 will be 6000T, but the present invention is not limited to this form of embodiment.

For example, the condition of printing will be as shown in FIGS. 15 (A) through 15 (C) in a system which achieves such a low level of performance as a whole that the product of these factors will be 3000T. FIG. 15 (A) illustrates a case in which the scanning density is 300 dpi, the printing speed is 10 ppm, and the period of the horizontal synchronizing signal 331 is T, and FIG. 15 (B) illustrates a case in which the scanning density is 300 dpi, the printing speed is 5 ppm, and the period of the horizontal synchronizing signal 331 is 2T. Further, FIG. 15 (C) illustrates a case in which the scanning density is 600 dpi, the printing speed is 5 ppm, and the period of the horizontal synchronizing signal 331 is T.

Figures 16A, 16B, 16C:
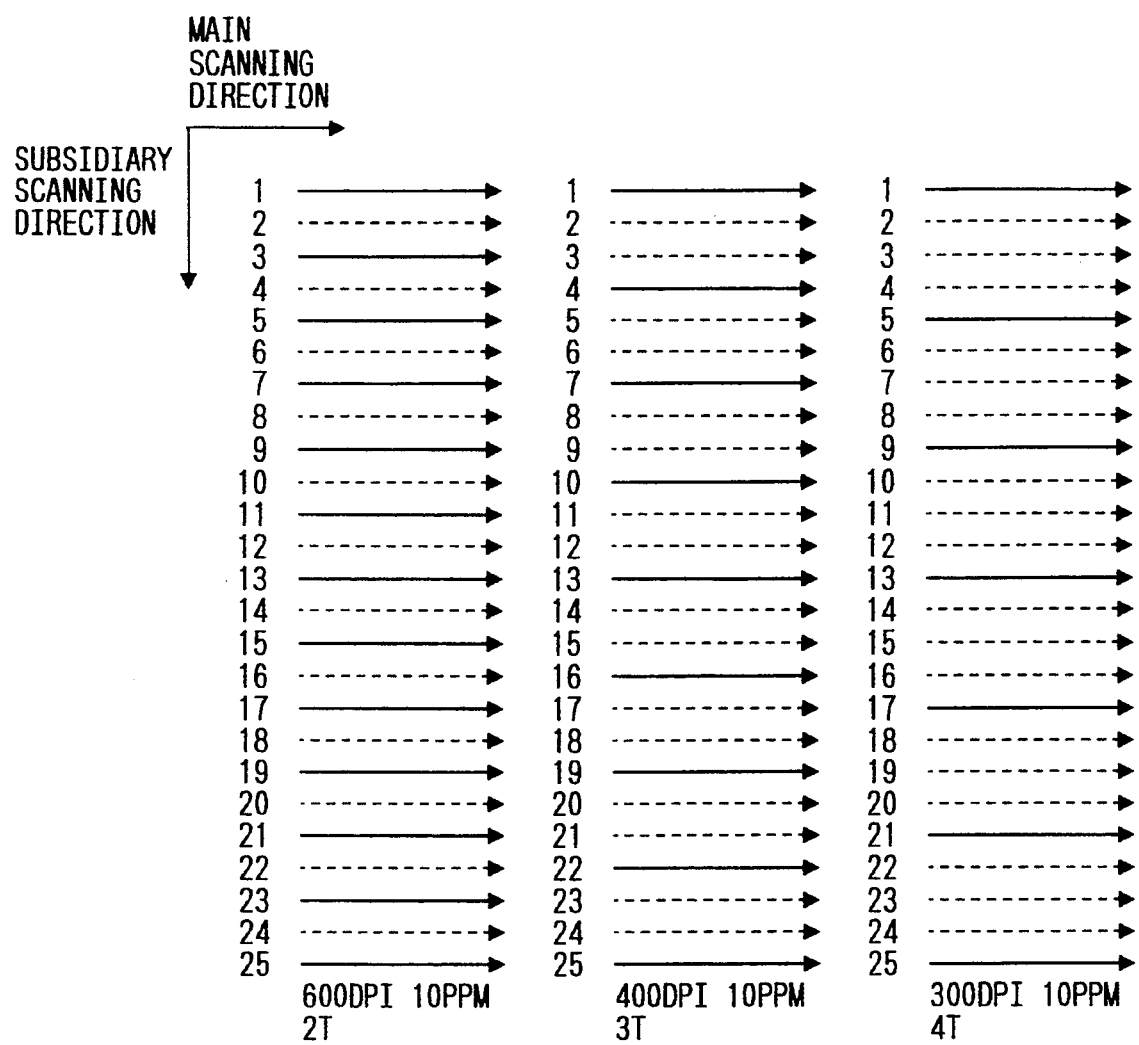
FIG. 16 (A), FIG. 16 (B), and FIG. 16 (C) are charts illustrating a fourth example of the condition of printing with the same laser beam printer.

On the other hand, the condition of printing will be as shown in FIGS. 16 (A) through 16 (C) in a system which achieves such a high level of performance as a whole that the product of these factors will be 12000T. FIG. 16 (A) illustrates a case in which the scanning density is 600 dpi, the printing speed is 10 ppm, and the period of the horizontal synchronizing signal 331 is 2T. FIG. 16 (B) illustrates a case in which the scanning density is 400 dpi, the printing speed is 10 ppm, and the period of the horizontal synchronizing signal 331 is 3T. Moreover, FIG. 16 (C) illustrates a case in which the scanning density is 300 dpi, the printing speed is 10 ppm, and the period of the horizontal synchronizing signal 331 is 4T.

As described hereinabove, this embodiment is capable of obtaining the horizontal synchronizing signal 331 in a predetermined period by thinning out the beam detecting signal 324 at appropriate intervals by the horizontal synchronizing signal control circuit 323.

In contrast to this, it is also possible to obtain the horizontal synchronizing signal 331 in a predetermined period by thinning out the laser beam itself which is fed in incidence upon the beam detector 322, as shown below as a third embodiment.

Figure 17:
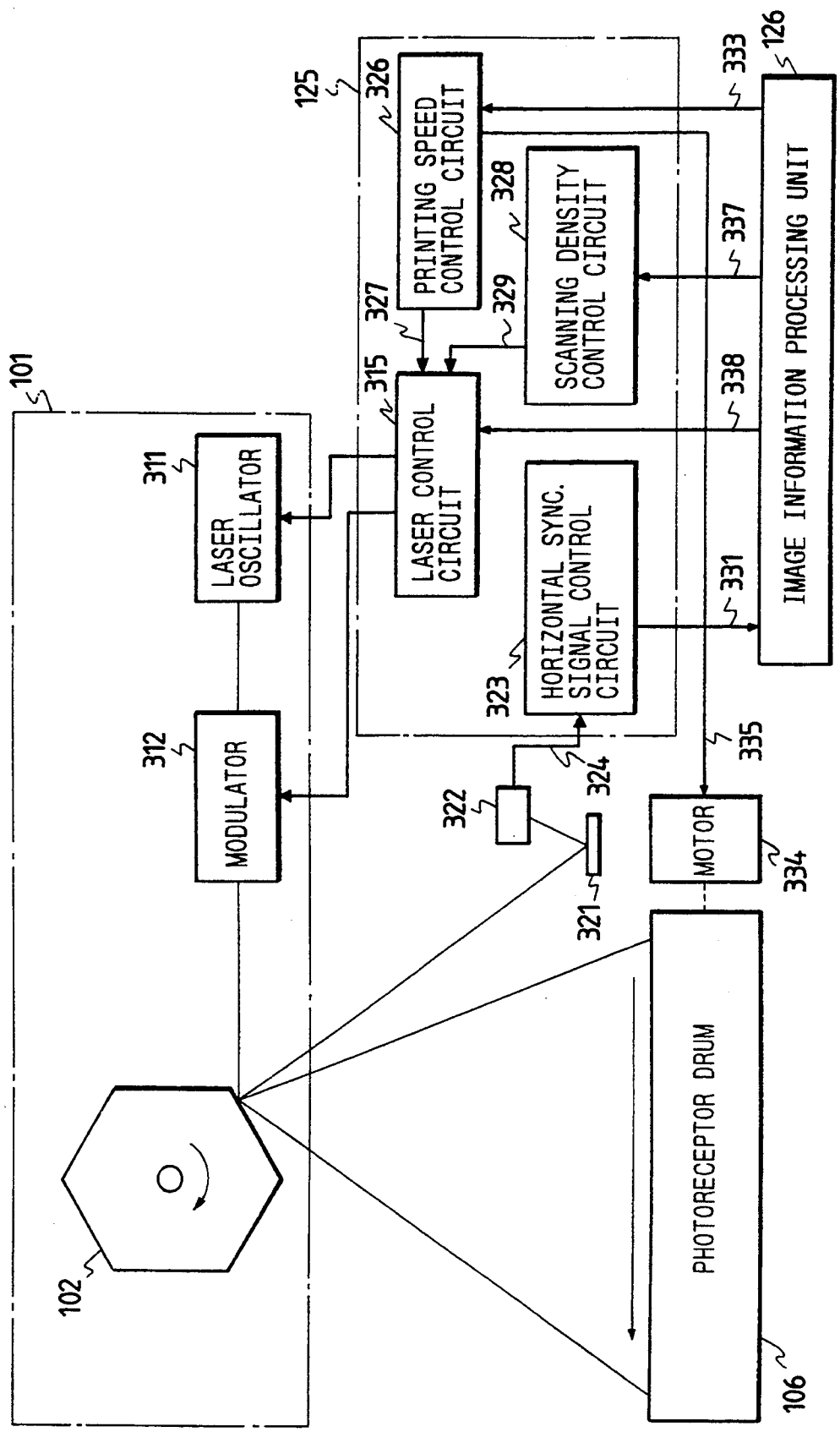
FIG. 17 is a block diagram illustrating the principal parts of a laser beam printer according to a third embodiment of the present invention.

FIG. 17 illustrates the essential parts of a laser beam printer in the third embodiment of the present invention. In this Figure, the same parts as those in the second embodiment are indicated with the same reference numerals attached to them, and a description of those parts will be omitted as appropriate.

In this example, the printing speed information 327, which is output from the printing speed control circuit 326, and the scanning density information 329, which is output from the scanning density control circuit 328, are supplied to the a laser control circuit 315.

The internal construction of the laser control circuit 315 is in almost the same circuit construction as that shown in FIG. 11, and the control circuit 315 is provided with a reference table for establishing the correspondence among the scanning density, the printing speed, and the period of the horizontal synchronizing signal 331.

This laser control circuit 315 performs the same operations as those described in the second embodiment. In other words, the CPU, which is not illustrated in the drawing, extracts an NT value to be used for the period of the horizontal synchronizing signal 331, with reference to the reference table, and then sets this N value in its own register.

The counter (not illustrated in the drawing) of this laser control circuit 315 counts the number of pulses in the rotation synchronizing signal fed out of an encoder (not illustrated in the drawing) which monitors the rotation of the polygon mirror 102 in synchronization with the rotation of each facet on the polygon mirror 102. The CPU monitors this count value, and, when this value has become equal to the value N which is stored in the register, the CPU controls the laser oscillator 311 and the modulator 312, and outputs a synchronizing beam to be incident upon the beam detector 322. By this, the beam detector 322 outputs the beam detecting signal 324 to the horizontal synchronizing signal control circuit 323.

The horizontal synchronizing signal control circuit 323 applies shaping or the like to the pulse waveform of the beam detecting signal 324 each time it receives the input of the signal and outputs the shaped pulse waveform as the horizontal synchronizing signal 331. The period of the horizontal synchronizing signal 331 is thereby set as NT.

The subsequent operations of this third embodiment are identical to the corresponding operations in the second embodiment.

Thus, in the third embodiment, the beam detecting signal 324 fed into the horizontal synchronizing signal control circuit 323 will not be thinned out, but the output itself of the synchronizing beam to the beam detector 322 will be thinned out by control of the laser oscillator 311.

What is claimed is:

1. An image forming apparatus comprising:
   a polygon mirror having a plurality of identical reflecting surfaces;
   a motor for rotating said polygon mirror at a constant speed;
   a laser beam light source for sequentially irradiating laser beams, each corresponding to image information for one line, to reflecting surfaces of said polygon mirror;
   a photoreceptor to which the laser beams are irradiated from the reflecting surfaces;
   image information processing means for holding image information for modulating the laser beams from said laser beam light source and print mode information for printing the image information; and
   laser beam output cycle control means for controlling output timings of the image information for each line in accordance with the print mode information so as to selectively use at least some of the plurality of reflecting surfaces of said polygon mirror to reflect the laser beams.

2. The image forming apparatus according to claim 1, further comprising photoreceptor speed control means for controlling a rotation speed of said photoreceptor in accordance with the print mode information.

3. The image forming apparatus according to claim 1, wherein the print mode information includes at least one of the group of pixel density information and print speed information.

4. The image forming apparatus according to claim 1, wherein less than all of the plurality of reflecting surfaces reflects laser beams when the image information is picture information.

5. The image forming apparatus according to claim 1, wherein every other one of the plurality of reflecting surfaces reflects laser beams when the image information is picture information.

* * * * *